United States Patent [19]

Hanafusa et al.

[11] Patent Number: 5,987,977
[45] Date of Patent: Nov. 23, 1999

[54] DEVICE FOR DETERMINING AN ABNORMAL DEGREE OF DETERIORATION OF A CATALYST

[75] Inventors: Toru Hanafusa, Susono; Michihiro Ohashi, Mishima, both of Japan

[73] Assignee: Toyota Jidosha Kabushiki Kaisha, Aichi-ken, Japan

[21] Appl. No.: 08/685,646

[22] Filed: Jul. 24, 1996

[30] Foreign Application Priority Data

Jul. 26, 1995 [JP] Japan ................................... 7-190803

[51] Int. Cl.$^6$ .................................................. G01M 19/00
[52] U.S. Cl. .......................................... 73/118.1; 73/118.2
[58] Field of Search ............................. 60/277, 274, 276, 60/285

[56] References Cited

U.S. PATENT DOCUMENTS

| 5,303,548 | 4/1994 | Shimizu et al. | 60/277 |
| 5,431,011 | 7/1995 | Casarella et al. | 60/274 |
| 5,591,905 | 1/1997 | Fujimoto et al. | 73/118.1 |

FOREIGN PATENT DOCUMENTS 0 492 165 A2   7/1992   European Pat. Off. .

OTHER PUBLICATIONS

Patent Abstracts of Japan, vol. 095, No. 004, May 31, 1995, Publication No. 07026944 dated Jan. 27, 1995.

*Primary Examiner*—Laurie Scheiner
*Assistant Examiner*—J. S. Parkin
*Attorney, Agent, or Firm*—Kenyon & Kenyon

[57] ABSTRACT

A device for determining the abnormal degree of deterioration of catalyst of a catalytic converter arranged in an internal combustion engine exhaust system is disclosed. The device comprises ability value grasping means for grasping an ability value in relation with a current purification ability of the catalyst and varying amount grasping means for grasping a varying amount of the ability value grasped by the ability value grasping means. It is determined that the degree of deterioration of the catalyst is abnormal when the varying amount grasped by the varying amount grasping means is smaller than a predetermined value.

7 Claims, 16 Drawing Sheets

DEVICE FOR DETERMINING AN ABNORMAL DEGREE OF DETERIORATION OF A CATALYST

BACKGROUND OF THE INVENTION

1. Field of the Invention

The present invention relates to a device for determining an abnormal degree of deterioration of a catalyst.

2. Description of the Related Art

A catalyst system is usually arranged in an exhaust passage to purify an exhaust gas. Once the catalyst system deteriorates excessively, the catalyst system cannot purify the exhaust gas sufficiently. Accordingly, it is necessary to determine an abnormal degree of deterioration of the catalyst, to inform the driver about the deterioration, and to urge the driver to exchange the catalyst for a new one.

The exchange requires much cost and much time that must be minimized. Accordingly, it is necessary to determine the abnormal degree of deterioration of a catalyst precisely.

Japanese Unexamined Patent Publication No. 7-26944 discloses a device for determining the abnormal degree of deterioration of a catalyst. The device grasps a variation of the degree of deterioration of the catalyst against the temperature thereof by using air-fuel ratio sensors. The device graphs the variation and compares the graph with a prepared threshold graph. The device determines that the degree of deterioration of the catalyst is abnormal when the graph of variation is positioned generally above the threshold graph.

The deterioration of the catalyst progresses from the upstream portion thereof to the downstream portion thereof because the upstream portion is always exposed to the non-purified exhaust gas. Accordingly, only the degree of deterioration of the upstream portion of the catalyst may be abnormal. In this case, if the temperature of the catalyst is very high and the catalyst is generally activated, the general purification ability thereof drops little. However, in the initial stage of the activation of the catalyst in which the upstream portion thereof ought to activate, the upstream portion does not activate so that the purification reaction does not start. Therefore, the catalyst is not heated by the reaction heat and the time till the catalyst is activated completely becomes long so that during this time, the purification of the exhaust gas deteriorates considerably. The above-mentioned device merely compares the variation of the degree of deterioration of the catalyst with the threshold graph. Accordingly, in such case, the device cannot accurately determine that the degree of deterioration of the catalyst is abnormal.

SUMMARY OF THE INVENTION

Therefore, an object of the present invention is to provide a device for determining the degree of deterioration of a catalyst, capable of determining accurately if the degree of deterioration thereof is abnormal.

According to the present invention, there is provided a device for determining the degree of deterioration of a catalyst of a catalytic converter arranged in an internal combustion engine exhaust system, comprising: ability value grasping means for grasping an ability value in relation to a current purification ability of the catalyst; varying amount grasping means for grasping a varying amount of the ability value grasped by the ability value grasping means; and abnormal condition detecting for determining that the degree of deterioration of the catalyst is abnormal when the varying amount grasped by the varying amount grasping means is smaller than a predetermined value.

The present invention will be more fully understood from the description of preferred embodiments of the invention set forth below, together with the accompanying drawings.

DESCRIPTION OF THE PREFERRED EMBODIMENTS

Figure 1:
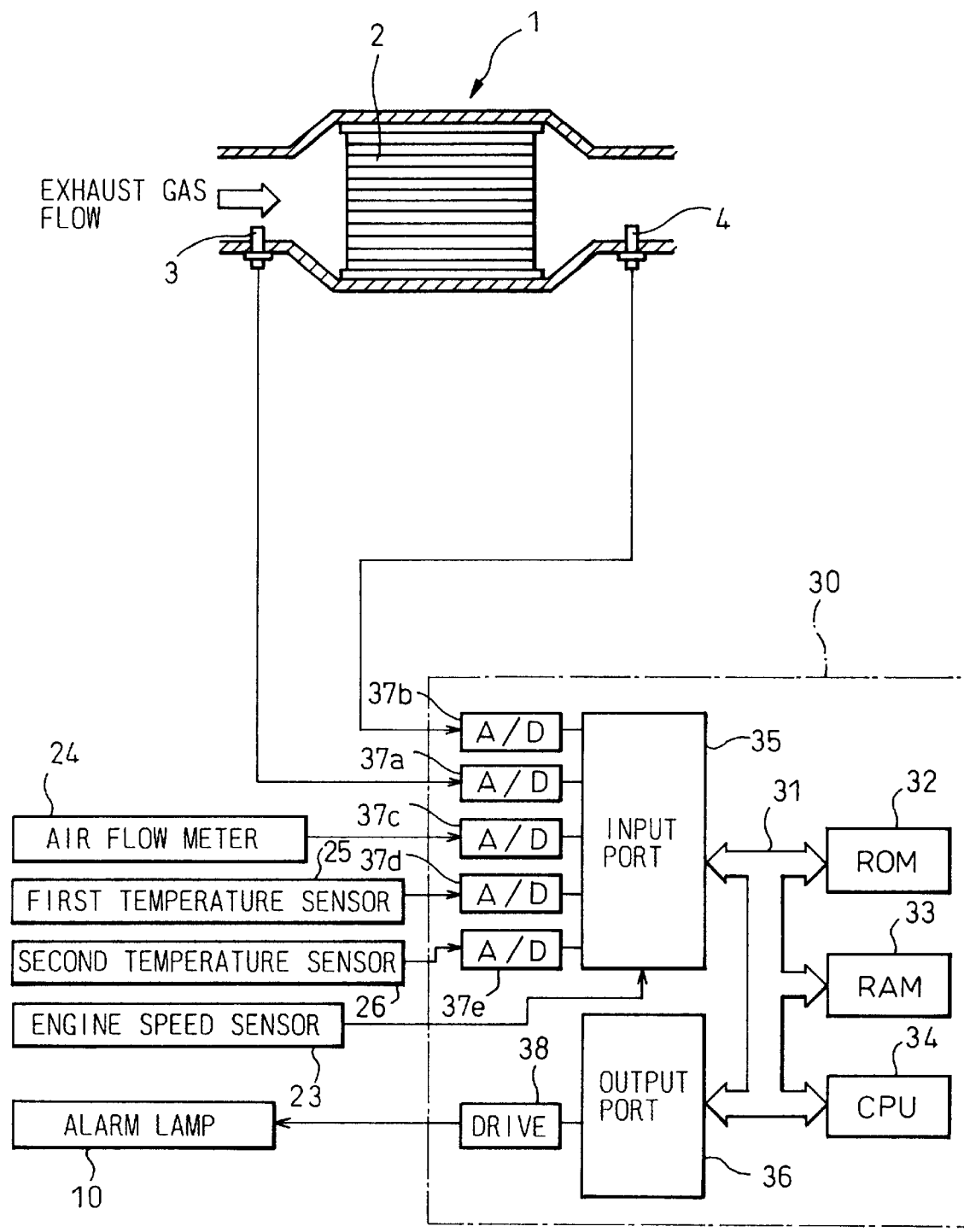
FIG. 1 is a sectional view of a part of an internal combustion engine exhaust system with a device for determining the abnormal degree of deterioration of a catalyst.

FIG. 1 is a sectional view of a part of an internal combustion engine exhaust system with a device for detecting an abnormal degree of deterioration of a catalyst according to the present invention. Referring to FIG. 1, reference numeral 1 designates a three-way catalytic converter which purifies the exhaust gas. The three-way catalytic converter has an $O_2$ storage ability such that it absorbs and stores excess oxygen existing in the exhaust gas when the air-fuel ratio in the exhaust gas is on the lean side, and it releases oxygen when the air-fuel ratio in the exhaust gas is on the rich side. Therefore, the air-fuel ratio in the exhaust gas becomes almost stoichiometric so that the three-way catalytic converter 1 can sufficiently purify the exhaust gas. The upstream side of the three-way catalytic converter 1 is connected to the engine body (not shown). On the other hand, the downstream side thereof is opened to the atmosphere, via a muffler (not shown). Reference numeral 2 designates a catalytic carrier which carries the catalyst. Reference numeral 3 designates a first air-fuel ratio sensor which detects an air-fuel ratio in the exhaust gas flowing into the catalytic carrier 2. Reference numeral 4 designates a second air-fuel ratio sensor which detects an air-fuel ratio in the exhaust gas flowing out of the catalytic carrier 2. The first and second air-fuel ratio sensors 3, 4 produce output voltages which are proportional to the air-fuel ratio in the exhaust gas.

The three-way catalytic converter 1 gradually deteriorates with the use thereof. When the degree of deterioration of the three-way catalyst has progressed to the state where it is necessary to replace the catalyst, the condition is determined to be abnormal. Reference numeral 30 is a device which determines when the catalyst converter needs to be replaced, i.e., when the catalyst has deteriorated to an abnormal degree.

The device 30 is an electronic control unit (ECU). The ECU 30 is constructed as a digital computer and includes a ROM (read only memory) 32, a RAM (random access memory) 33, a CPU (microprocessor, etc.) 34, an input port 35, and an output port 36, which are interconnected by a bidirectional bus 31. The output voltages of the first and second air-fuel ratio sensors 3, 4 are input into the input port 35 via AD converters 37a, 37b, respectively. An engine speed sensor 23, which produces an output pulse representing the engine speed, is connected to the input port 35. An air flow meter 24 produces an output voltage which is proportional to the amount of air fed into the engine cylinder, and this output voltage is input into the input port 35 via an AD converter 37c. A first temperature sensor 25 produces an output voltage which is proportional to the temperature of the engine cooling water, and this output voltage is input into the input port 35 via an AD converter 37d. A second temperature sensor 26 produces an output voltage which is proportional to the temperature of the atmosphere, and this output voltage is input into the input port 35 via an AD converter 37e. The output port 36 is connected through a drive circuit 38 to an alarm lamp 10 to show that the degree of deterioration of the three-way catalytic converter 1 has become abnormal. In the engine, an amount of injected fuel is controlled such that an air-fuel ratio in the mixture becomes almost stoichiometric by means of the first and second air-fuel ratio sensors 3, 4. The fuel injection control is a conventional air-fuel ratio feed-back control.

Figure 2:
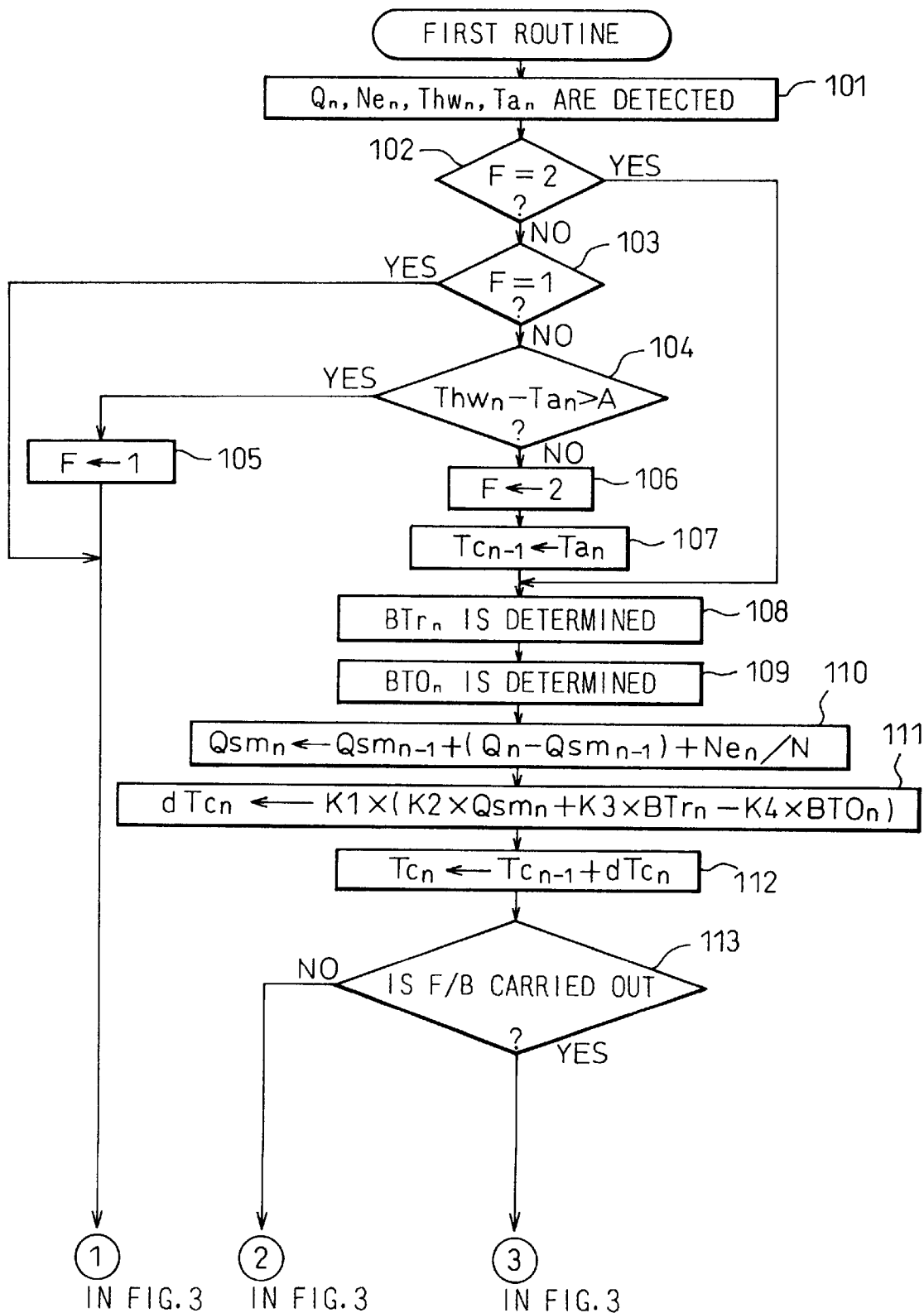
FIG. 2 is a part of a first routine for determining the abnormal degree of deterioration of a catalyst.
Figure 3:
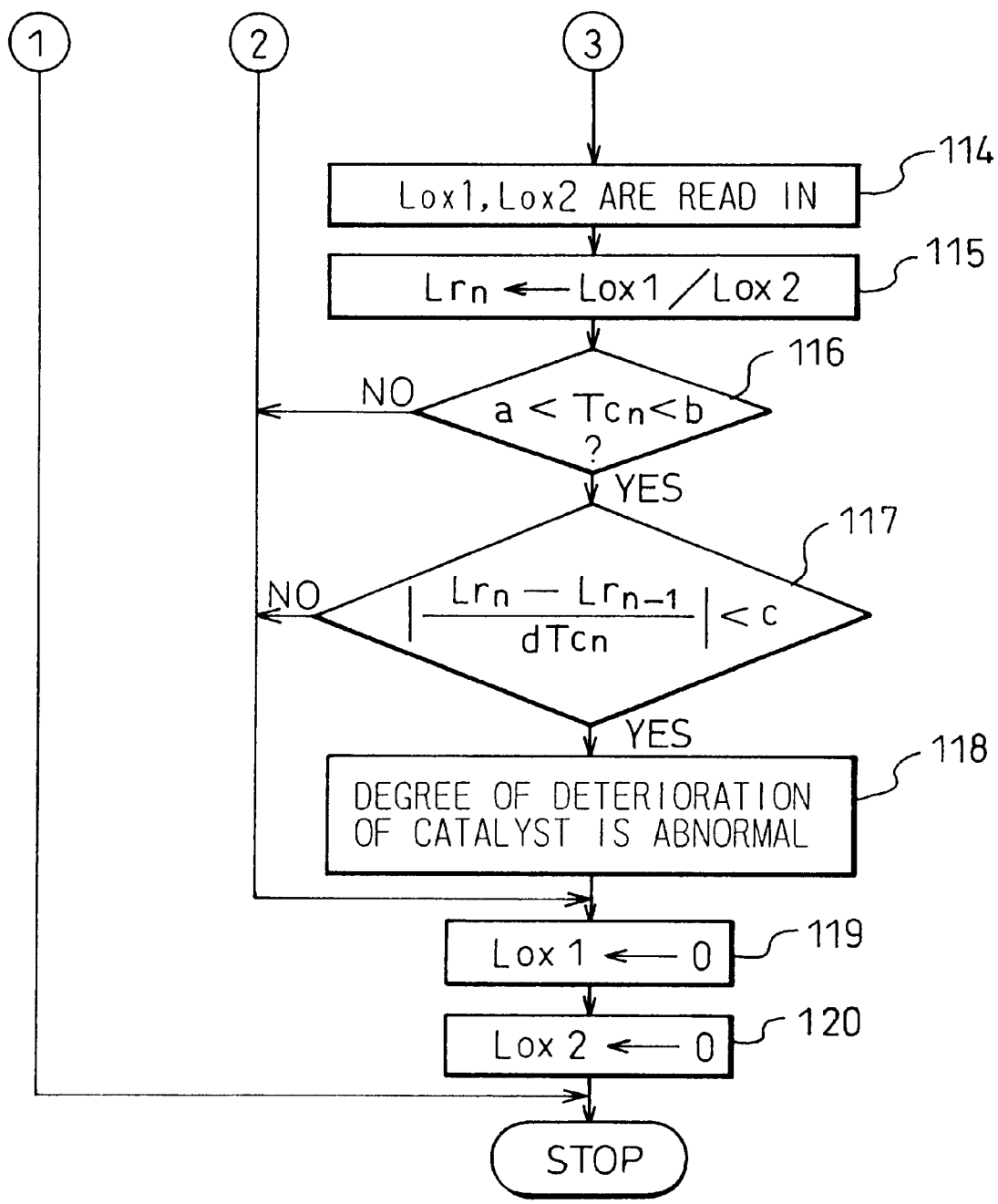
FIG. 3 is the remainder of the first routine.

FIGS. 2 and 3 show a first routine for detecting an abnormal degree of deterioration of the three-way catalytic converter 1. The first routine is started simultaneously with the engine starting and is repeated at every predetermined period. First, at step 101, a current amount of intake air $[Q_n]$, a current engine speed $[Ne_n]$, a current temperature of the engine cooling water $[Thw_n]$, and a current temperature of the atmosphere $[Ta_n]$ are detected by the above-mentioned sensors. Next, at step 102, it is determined if a flag [F] is [2]. The flag [F] is reset to [0] when the engine is stopped. Accordingly, the result at step 102 is negative and the routine goes to step 103. At step 103, it is determined if a flag [F] is [1]. The result is negative similarly and the routine goes to step 104.

At step 104, it is determined if a difference between the temperature of the engine cooling water $[Thw_n]$ and the temperature of the atmosphere $[Ta_n]$ is larger than a predetermined value [A]. When the result is affirmative, the engine has been started again immediately after it was stopped so that the routine goes to step 105 and the flag [F] is made [1] and the routine is stopped. On the other hand, when the result at step 104 is negative, the routine goes to step 106 and the flag [F] is made [2]. Thereafter, the routine goes to step 107.

Figure 4:
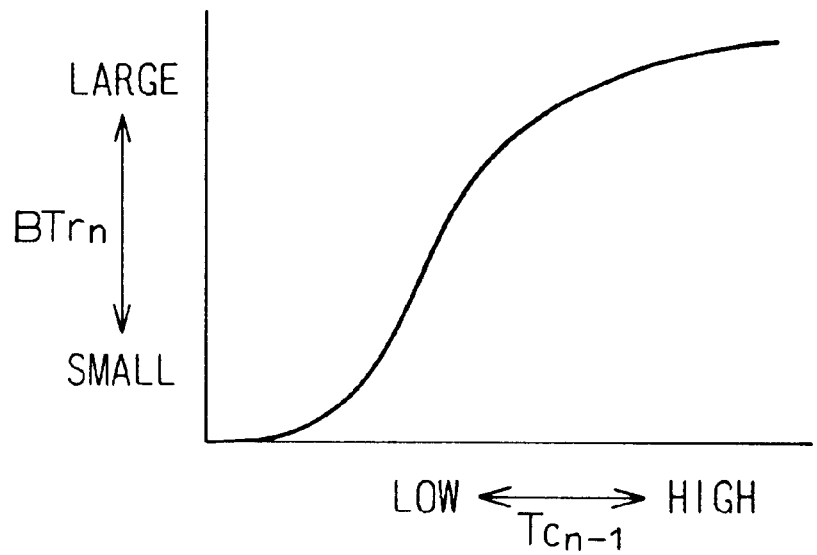
FIG. 4 is a map for determining an amount of basic reaction heat used in the first routine.

At step 107, the temperature of the atmosphere $[Ta_n]$ is made an assumed temperature of the catalyst at the last time $[Tc_{n-1}]$. At step 108, an amount of basic reaction heat $[BTr_n]$ at this time is determined by a map shown in FIG. 4, on the basis of the assumed temperature of the catalyst at last time $[Tc_{n-1}]$. An amount of basic reaction heat is an amount of heat which is generated by the purification of the exhaust gas at a current temperature of the catalyst, i.e., a current degree of activation of the catalyst. Accordingly, the higher the temperature of the catalyst becomes, the larger an amount of basic reaction heat is set on the map shown in FIG. 4. The amount of basic reaction heat varies according to not only the temperature of the catalyst, but also the current purification ability of the catalyst. Accordingly, a similar map is provided in every purification ability of the catalyst and a map used at step 108 is selected from these maps on the basis of the purification ability at the last time $[Lr_{n-1}]$ which is explained below in detail.

Figure 5:
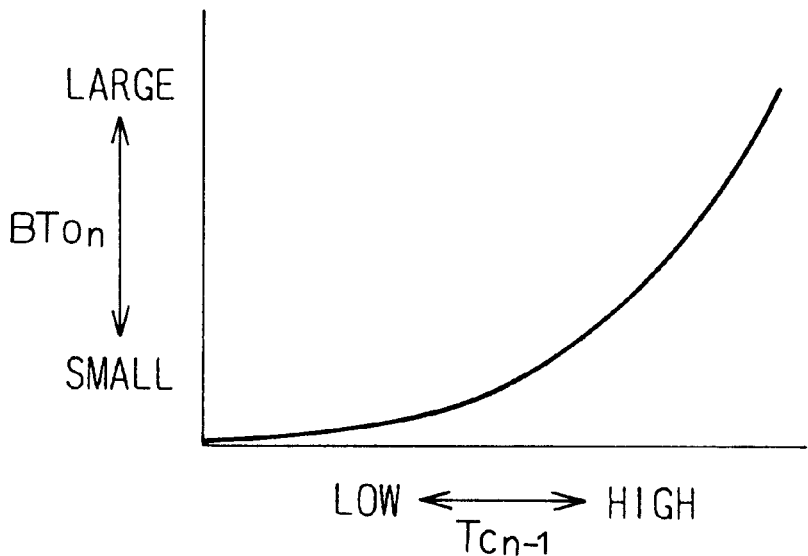
FIG. 5 is a map for determining an amount of basic radiation heat used in the first routine.

Next, at step 109, an amount of basic radiation heat at this time $[BTo_n]$ is determined by a map shown in FIG. 5, on the basis of the assumed temperature of the catalyst at the last time $[Tc_{-1}]$. The amount of basic radiation heat is an amount of heat which radiates from the catalyst. Accordingly, the higher the temperature of the catalyst becomes, the larger an amount of basic radiation heat is set on the map shown in FIG. 5.

At step 110, an amount of exhaust gas flowing into the catalytic carrier 2 is calculated by an expression (1), as an amount of calculated intake air $[Qsm_n]$.

$$Qsm_n = Qsm_{n-1} + (Q_n - Qsm_{n-1}) * Ne_n / N \qquad (1)$$

The expression (1) represents smoothing process of an amount of intake air. In the expression (1), $[Q_n]$ is an amount of measured intake air at this time. $[Qsm_{n-1}]$ is an amount of calculated intake air at the last time and at the first routine this is set as the usual amount of idle intake air, as an initial value immediately after the engine is started. Of course, the initial value can take account of the variation of idle intake air according to the temperature of the engine cooling water [Thw]. $[Ne_n]$ is the engine speed. [N] is a predetermined value. The premise of expression (1) is that the lower the current engine speed is, the smaller the absolute value of the varying amount of intake air is.

Next, the routine goes to step 111 and a varying value of the temperature of the catalyst at this time $[dTc_n]$ is calculated by an expression (2).

$$dTc_n = K1 * (K2 * Qsm_n + K3 * BTr_n - K4 * BTo_n) \qquad (2)$$

In the expression (2), a second correction coefficient [K2] is used to convert the amount of calculated intake air $[Qsm_n]$ as the amount of exhaust gas flowing into the catalytic carrier into an amount of heat given to the catalyst by the exhaust gas at this time. The coefficient [K2] takes account of the temperature of the exhaust gas assumed on the basis of a current engine operating condition determined by a current amount of intake air $[Q_n]$, a current engine speed

[$Ne_n$], a current temperature of the engine cooling water [$Thw_n$], and the like. A third correction coefficient [K3] is used to convert the amount of basic reaction heat [$BTr_n$] at this time which takes account of the degree of activation of the catalyst into an amount of actual reaction heat. The coefficient [K3] takes account of the amount of exhaust gas and the air-fuel ratio determined on the basis of the current engine operating condition. A fourth correction coefficient [K4] is used to convert the amount of basic radiation heat [$BTo_n$] at this time, which takes account of the temperature of the catalyst, into an amount of actual radiation heat. The coefficient [K4] takes account of the temperature of the atmosphere [$Ta_n$] and the amount of exhaust gas. Thus, the second coefficient [K2], the third coefficient [K3], and the fourth coefficient [K4] are again determined by the use of maps (not shown) when the process at step 111 is repeated. On the other hand, a first correction coefficient [K1] is used to convert an amount of heat which increases or decrease in such manner in the catalyst into an average varying value of the temperature in each portion of the catalytic carrier 2.

Next, the routine goes to step 112 and an assumed temperature of the catalyst at this time [$Tc_n$] is calculated in a manner that the average varying value of the temperature of the catalyst [$dTc_n$] is added to the assumed temperature of the catalyst at last time [$Tc_{n-1}$]. Next, at step 113, it is determined if the above mentioned air-fuel ratio feed-back control [F/B] is carried out. When the result is affirmative, the routine goes to step 114, and a first integration value [Lox1] of output local length of the first air-fuel ratio sensor 3 and a second integration value [Lox2] of output local length of the second air-fuel ratio sensor 4 are read in from a routine shown in FIG. 6. On the other hand, when the result at step 113 is negative, for example, in the case that a fuel-cut is carried out during a deceleration of the engine, the routine goes to steps 119, and the first integration value [Lox1] is reset to [0] in the present routine and in the routine shown in FIG. 6. Next, at step 120, the second integration value [Lox2] is reset to [0] in the present routine and in the routine shown in FIG. 6. Next, the routine is stopped.

Figure 6:
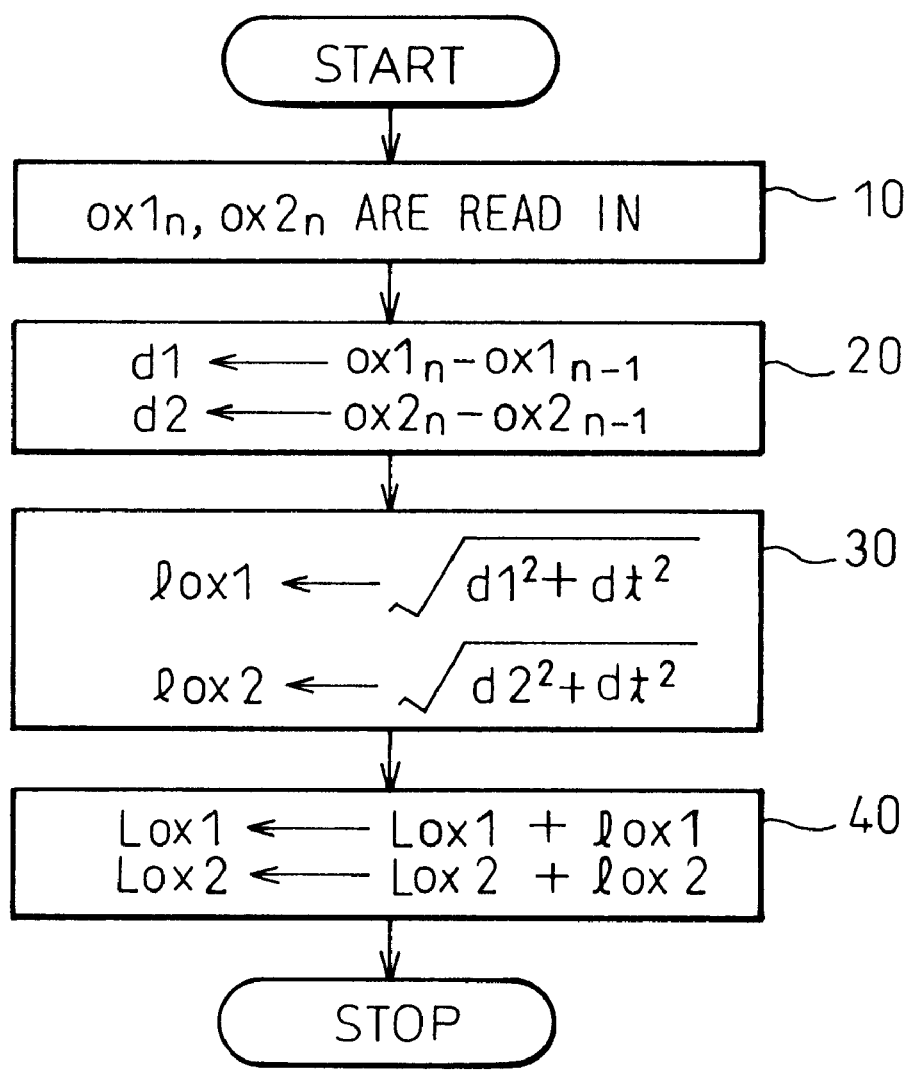
FIG. 6 is a routine for calculating a first and second integration value used in the first routine.

Here, the routine shown in FIG. 6 is explained as follows. The routine is started simultaneously with the engine starting and is repeated at every predetermined period [dt] which is between one-tenth and one-thousandth of the repeating period of the first routine. Initially, at step 10, an output [$ox1_n$] of the first air-fuel ratio sensor 3 at this time and an output [$ox2_n$] of the second air-fuel ratio sensor 4 at this time are read in. At step 20, a difference [d1] between the output [$ox1_n$] at this time and the output [$ox1_{n-1}$] at the last time of the first air-fuel ratio sensor 3, and a difference [d2] between the output [$ox2_n$] at this time and the output [$ox2_{n-1}$] at last time of the second air-fuel ratio sensor 4 are calculated.

Next, the routine goes to step 30, and the first output local length [lox1] of the first air-fuel ratio sensor 3 and the second output local length [lox2] of the second air-fuel ratio sensor 4 are calculated by expressions (3) and (4).

$$lox1 = (d1^2 + dt^2)^{0.5} \tag{3}$$

$$lox2 = (d2^2 + dt^2)^{0.5} \tag{4}$$

Next, at step 40, as shown in expressions (5) and (6), the first output local length [lox1] and the second output local length [lox2] are integrated respectively after previous integration values had been reset to [0], and thus the first integration value [Lox1] and the second integration value [Lox2] are calculated. Thereafter, the routine is stopped.

$$Lox1 = Lox1 + lox1 \tag{5}$$

$$Lox2 = Lox2 + lox2 \tag{6}$$

Returning to the first routine, after the first and second integration values [Lox1] and [Lox2] which are calculated in such manner, are read in, the routine goes to step 115 and a ratio [$Lr_n$] of the first integration value [Lox1] to the second integration value [Lox2] is calculated. The $O_2$ storage ability of the three-way catalytic converter 1 drops according to the deterioration of the catalyst so that a current $O_2$ storage ability almost corresponds to a current purification ability of the catalyst. When the $O_2$ storage ability does not drop, the air-fuel ratio in exhaust gas downstream of the catalyst becomes almost stoichiometric so that the second integration value [Lox2] becomes a minimum and thus the ratio [$Lr_n$] becomes large. Conversely, when the $O_2$ storage ability is completely lost, the excess or deficiency of oxygen in the exhaust gas is not completely compensated for so that the output of the second air-fuel ratio sensor 4 varies almost the same as the first air-fuel ratio sensor 3, and thus the second integration value [Lox2] becomes a maximum. Therefore, the ratio [$Lr_n$] becomes [1]. Accordingly, ratio [$Lr_n$] becomes equivalent to a current purification ability of the catalyst.

Next, the routine goes to step 116, and it is determined if the assumed temperature of the catalyst at this time [$Tc_n$] is within a predetermined range [a–b]. When the result is affirmative, the catalyst is warming up before the catalyst activates completely and the routine goes to step 117. An absolute value of a ratio of a varying value of the purification ability of the catalyst [$Lr_n - Lr_{n-1}$] to the varying value of the assumed temperature of the catalyst [$dTc_n$] is calculated, as a varying amount of the purification ability of the catalyst. It is determined if the absolute value [$|(Lr_n - Lr_{n-1})/dTc_n|$] is smaller than a predetermined value [c]. When the result is affirmative, the routine goes to step 118 and it is determined that the degree of deterioration of the catalyst is abnormal and this is informed to the driver by an alarm lamp 10. Next, the routine goes to step 119 and the first integration value [Lox1] is reset to [0]. At step 120, the second integration value [Lox2] is reset to [0] and the routine is stopped. On the other hand, when the result at step 117 is negative, the degree of deterioration of the catalyst is normal and the process at steps 119 and 120 is carried out and the routine is stopped.

The premise of the present routine is that when the engine is started, the temperature of the catalyst is nearly equal to the temperature of the atmosphere [Ta], and assumes the temperature of the catalyst [Tc]. Accordingly, when the result at step 104 is affirmative, i.e., when the engine is started again immediately after it was stopped, the flag [F] is made [1] and thereafter the result at step 103 remains affirmative and thus the routine is stopped without determining the degree of deterioration of the catalyst. If the result at step 104 is negative when the engine is started, the flag [F] is made [2] and thereafter the result at step 102 remains affirmative and thus the process after step 108 is repeated.

Figure 7:
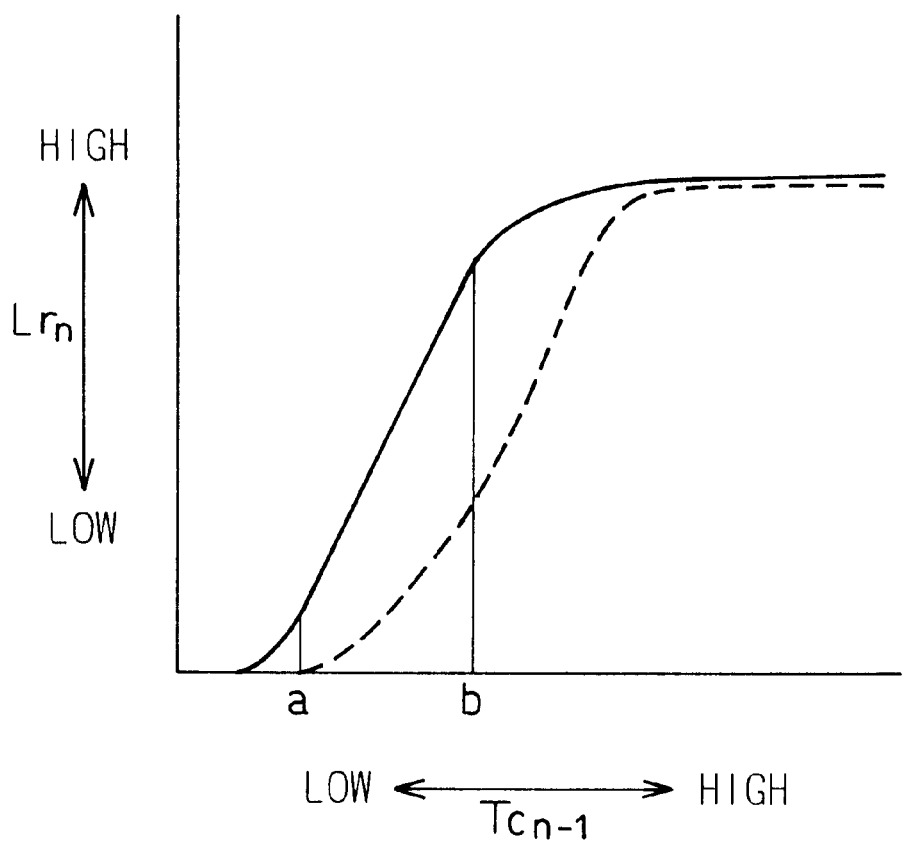
FIG. 7 is a graph which shows a relationship between the purification ability of the catalyst and the temperature thereof.

FIG. 7 is a graph which shows a relationship between the purification ability of the catalyst and the temperature thereof. The solid line shows the case that the degree of deterioration of the catalyst is normal. The dotted line shows the case that only the degree of deterioration of the upstream portion of the catalyst is abnormal. In this case, if the temperature of the catalyst is very high and the catalyst activates generally, the general purification ability thereof drops little as shown by the dotted line. However, if it is determined that this is normal, during a relatively long time till the catalyst activates completely, the purification of the exhaust gas deteriorates considerably.

In the routine of FIGS. 2 and 3, it is determined if a ratio of the varying value of the purification ability of the catalyst per unit of time $[Lr_n-Lr_{n-1}]$ to the varying value of the temperature of the catalyst per unit of time $[dTc_n]$ is smaller than the predetermined value [c]. When the result is affirmative, i.e., when an inclination of a graph in the catalyst is smaller than an inclination [c] of a graph in a catalyst which the degree of deterioration is the maximum permissible limit, it is determined that the degree of deterioration of the catalyst is abnormal. Accordingly, in the above-mentioned case, it is determined that the degree of deterioration of the catalyst is abnormal. The determination at step 117 uses the absolute value of the ratio whereby, if the varying value of the assumed temperature of the catalyst becomes negative by any factor, a mistake in the determination is prevented.

The determination at step 117 is carried out only when the temperature of the catalyst is within the predetermined range [a–b] in which the above-mentioned inclination [c] becomes relative large. Whereby, it can be determined very accurately if the degree of deterioration of the catalyst is abnormal.

Figure 8:
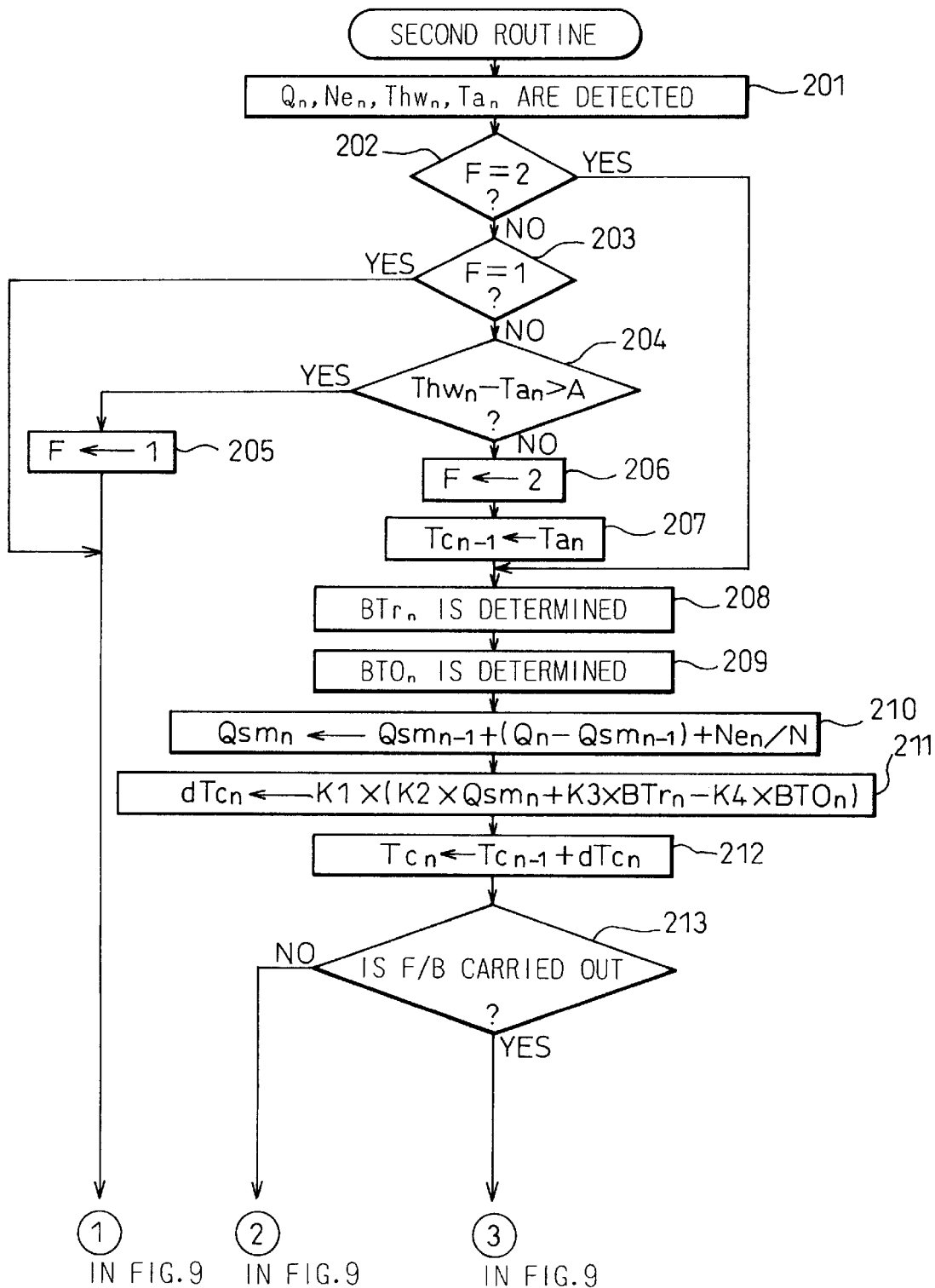
FIG. 8 is a part of a second routine for determining the abnormal degree of deterioration of a catalyst.
Figure 9:
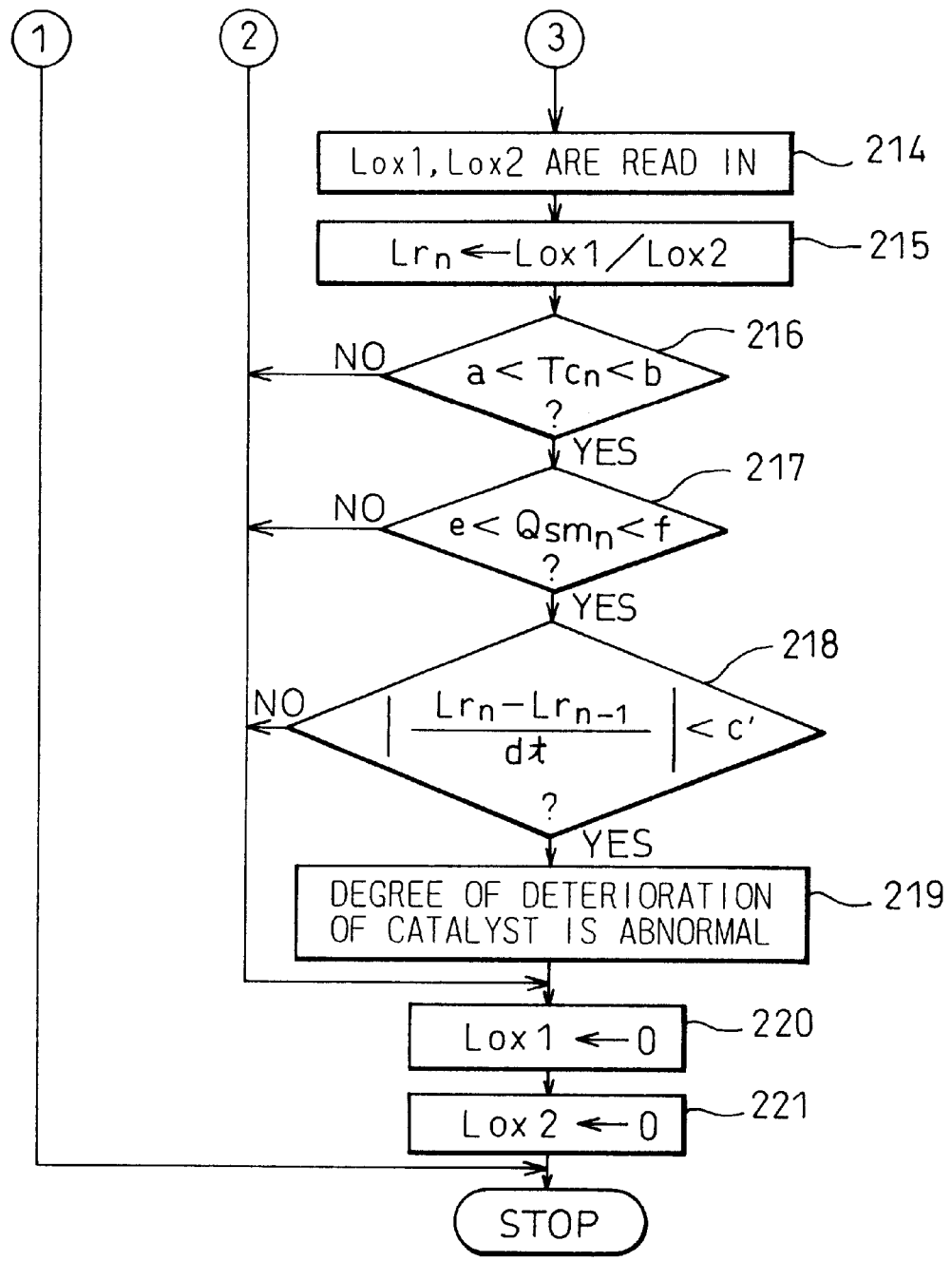
FIG. 9 is the remainder of the second routine.

FIGS. 8 and 9 show a second routine for determining the abnormal degree of deterioration of the three-way catalytic converter 1. The differences between the first routine and the second routine only are explained as follows. In the second routine, when the temperature of the catalyst $[Tc_n]$ is within the predetermined range [a–b], the routine goes to step 217 and it is determined if the amount of calculated intake air $[Qsm_n]$ is within a predetermined range [e–f]. When the result is affirmative, the routine goes to step 218. An absolute value of a ratio of a varying value of the purification ability of the catalyst $[Lr_n-Lr_{n-1}]$ to the varying value of time [dt] is calculated, as a varying amount of the purification ability of the catalyst. It is determined if the absolute value of the ratio is smaller than a predetermined value [c']. The varying value of time [dt] is the predetermined period for repeating the routine. When the result at step 218 is affirmative, the routine goes to step 219 and it is determined that the degree of deterioration of the catalyst is abnormal.

In the second routine, when the amount of intake air is within the predetermined range [e–f], i.e., when, in the engine steady operating condition, the varying of time corresponds to the varying of the temperature of the catalyst regularly so that a ratio of a varying value of the purification ability of the catalyst $[Lr_n-Lr_{n-1}]$ to the varying value of time [dt] can be used in the determination of the abnormal degree of deterioration of the catalyst.

In the first and second routines, as the method of detecting the purification ability of the catalyst, other usual methods, for example, a comparison between an inversion period (from lean side to rich side, or from rich side to lean side) of output of the first air-fuel ratio sensor and of the second air-fuel ratio sensor, or the comparison between a time integration value of output of the first air-fuel ratio sensor and one of the second air-fuel ratio sensor, can be utilized.

Figure 10:
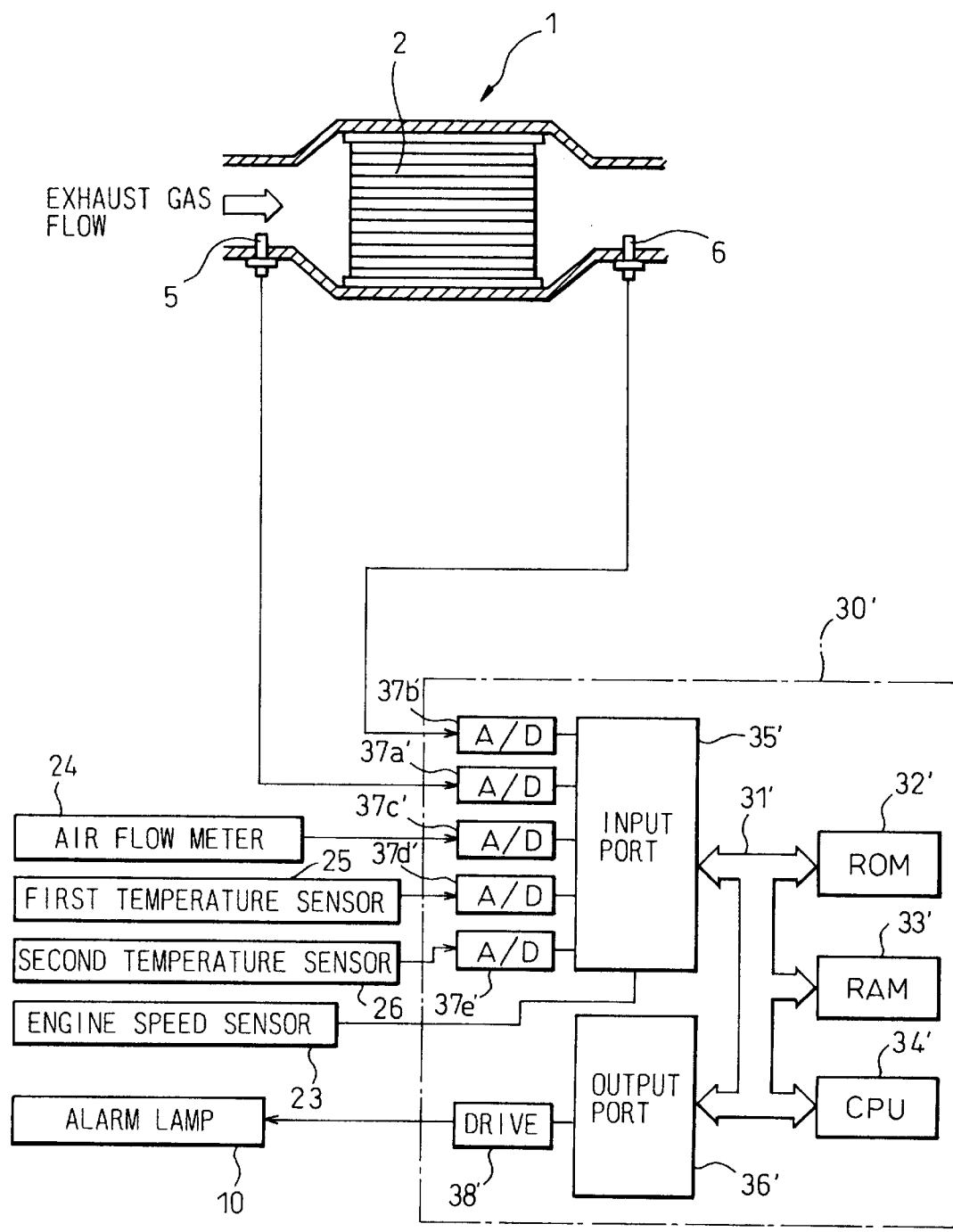
FIG. 10 is a sectional view of a part of an internal combustion engine exhaust system with another device for determining the abnormal degree of deterioration of a catalyst.
Figure 11:
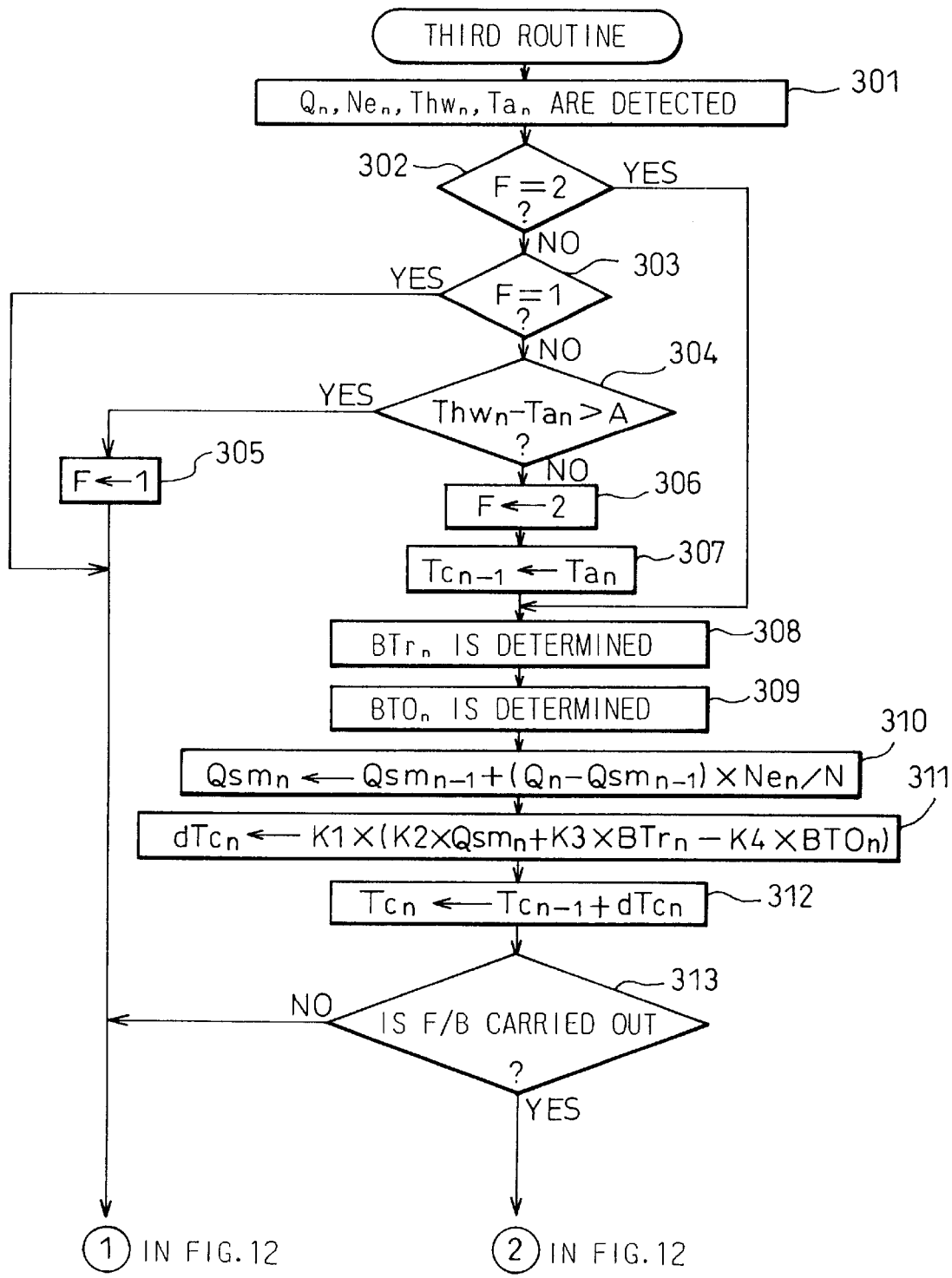
FIG. 11 is a part of a third routine for determining the abnormal degree of deterioration of a catalyst.
Figure 12:
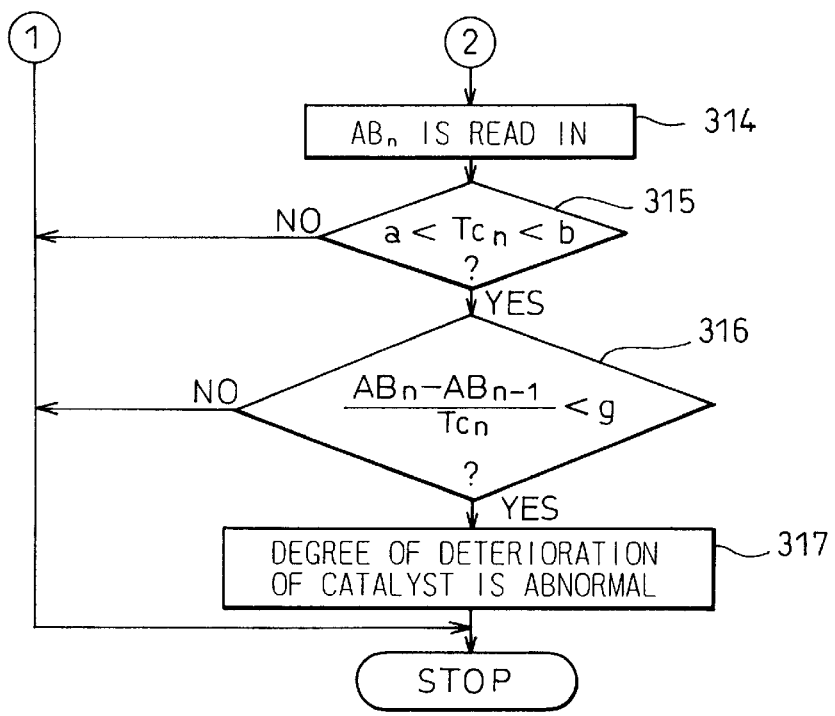
FIG. 12 is the remainder of the third routine.

In the first and second routines, as a current purification ability of the catalyst, a current $O_2$ storage ability thereof is utilized. However, a current purification ability of the catalyst can be directly detected such that at least one HC sensor detects HC concentration in the exhaust gas. FIG. 10 is a sectional view of a part of an internal combustion engine exhaust system with a device for determining the abnormal degree of deterioration of a catalyst, using two HC sensors. The difference between FIGS. 10 and 11 is to have a first HC sensor 5 and a second HC sensor 6, instead of the first air-fuel ratio sensor 3 and the second air-fuel ratio sensor 4. The first and second HC sensors 5, 6 produce output voltages which are proportional to HC concentration in the exhaust gas. The device 30' determines if the degree of deterioration of the catalyst is abnormal, according to a third routine shown in FIGS. 11 and 12.

The differences between the present routine and the above-mentioned first routine only are explained as follows. In this routine, when the air-fuel ratio feed-back control [F/B] is carried out after the current temperature of the catalyst $[Tc_n]$ is calculated at step 312, the routine goes to step 314 and a current purification ability of the catalyst $[AB_n]$ is read in. The current purification ability $[AB_n]$ is calculated in a routine shown in FIG. 13. Thereafter, the routine goes to step 315 and it is determined if the current temperature of the catalyst $[Tc_n]$ is within the predetermined range [a–b], the same as in the first routine. When the result is affirmative, the routine goes to step 316. An absolute value of a ratio of a varying value of the purification ability of the catalyst $[AB_n-AB_{n-1}]$ to the varying value of the temperature of the catalyst $[dTc_n]$ is calculated, as a varying amount of the purification ability of the catalyst. It is determined if the absolute value of the ratio is smaller than a predetermined value [g]. When the result is affirmative, the routine goes to step 317 and it is determined that the degree of deterioration of the catalyst is abnormal and this is informed to the driver by an alarm lamp 10.

Figure 13:
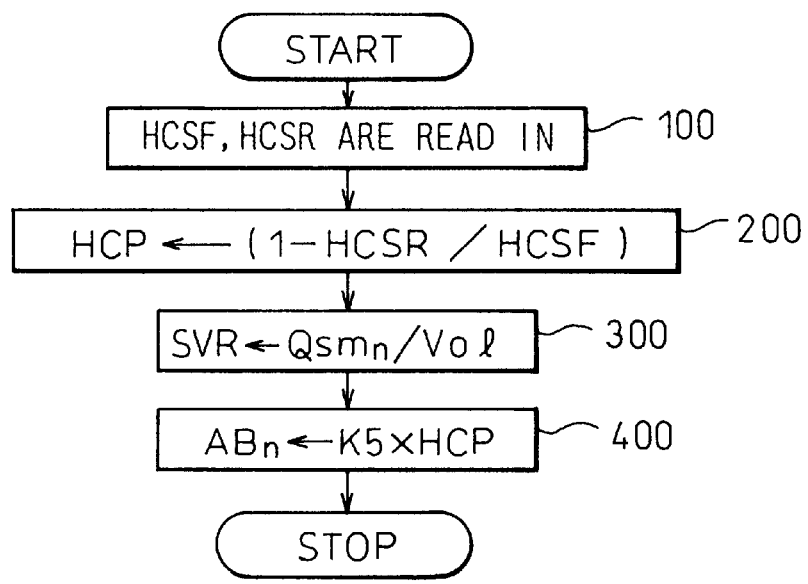
FIG. 13 is a routine for calculating the purification ability of the catalyst.

The routine shown in FIG. 13 is repeated at every predetermined period as same as the repeating period of the third routine. The integration of value on the basis of output of the sensor is not required so that the reset corresponding to steps 119, 120 in the first routine is eliminated. In this routine, at step 100, an output of the first HC sensor 5, i.e., HC concentration in exhaust gas flowing into the catalytic carrier 2 [HCSF], and an output of the second HC sensor 6, i.e., HC concentration in exhaust gas flowing out from the catalytic carrier 2 [HCSR], are read in. Next, at step 200, a rate of purification of hydrocarbon [HCP] is calculated by an expression (7).

$$HCP=(1-HCSR/HCSF) \qquad (7)$$

Figure 14:
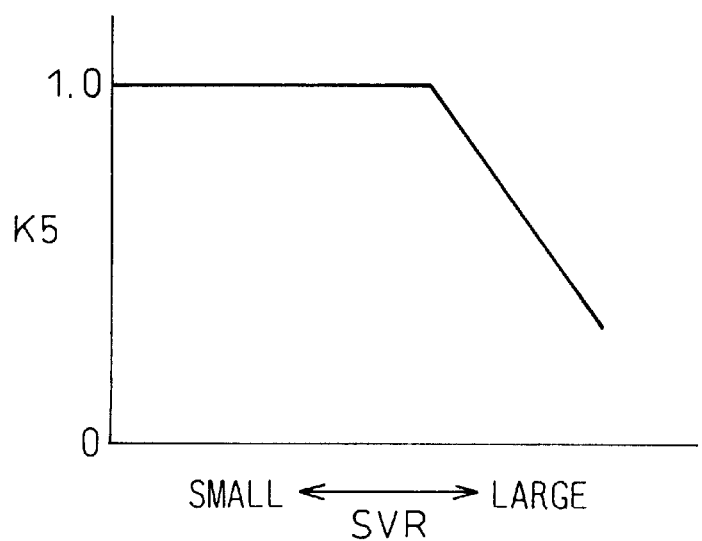
FIG. 14 is a map for determining a coefficient used in the routine of FIG. 13.

The rate of purification of hydrocarbon [HCP] varies in accordance with not only the purification ability of the catalyst but also a catalytic carrier space speed (a ratio of an amount of exhaust gas to a catalytic carrier capacity). Because, in case that the catalytic carrier space speed is large, if the purification ability of the catalyst is high, the amount of hydrocarbon blowing through the catalytic carrier without being purified becomes large. Accordingly, at step 300, a current catalytic carrier space speed [SVR] is calculated such that a current amount of intake air $[Qsm_n]$ calculated at step 310, as a current amount of exhaust gas, is divided by the catalytic carrier capacity [Vol]. Next, at step 400, a fifth coefficient [K5] is determined by a map shown in FIG. 14, on the basis of the current catalytic carrier space speed [SVR], and a current purification ability of the catalyst $[AB_n]$ is calculated such that the rate of purification of hydrocarbon is multiplied by the fifth coefficient [K5]. In the map shown in FIG. 14, a fifth coefficient is set such that the rate of purification of hydrocarbon drops when the catalytic carrier space speed [SVR] is larger than a predetermined value.

In the third routines, the purification ability of the catalyst is directly grasping it by the HC sensors, instead of indirectly grasping it by the air-fuel ratio sensors. Therefore, the obtained purification ability is more accurate so that the determination of the abnormal degree of deterioration of the catalyst can be made more accurate. Moreover, the routine can determine if the degree of deterioration of the catalyst is abnormal in a catalytic converter which does not have the $O_2$ storage ability.

Figure 15:
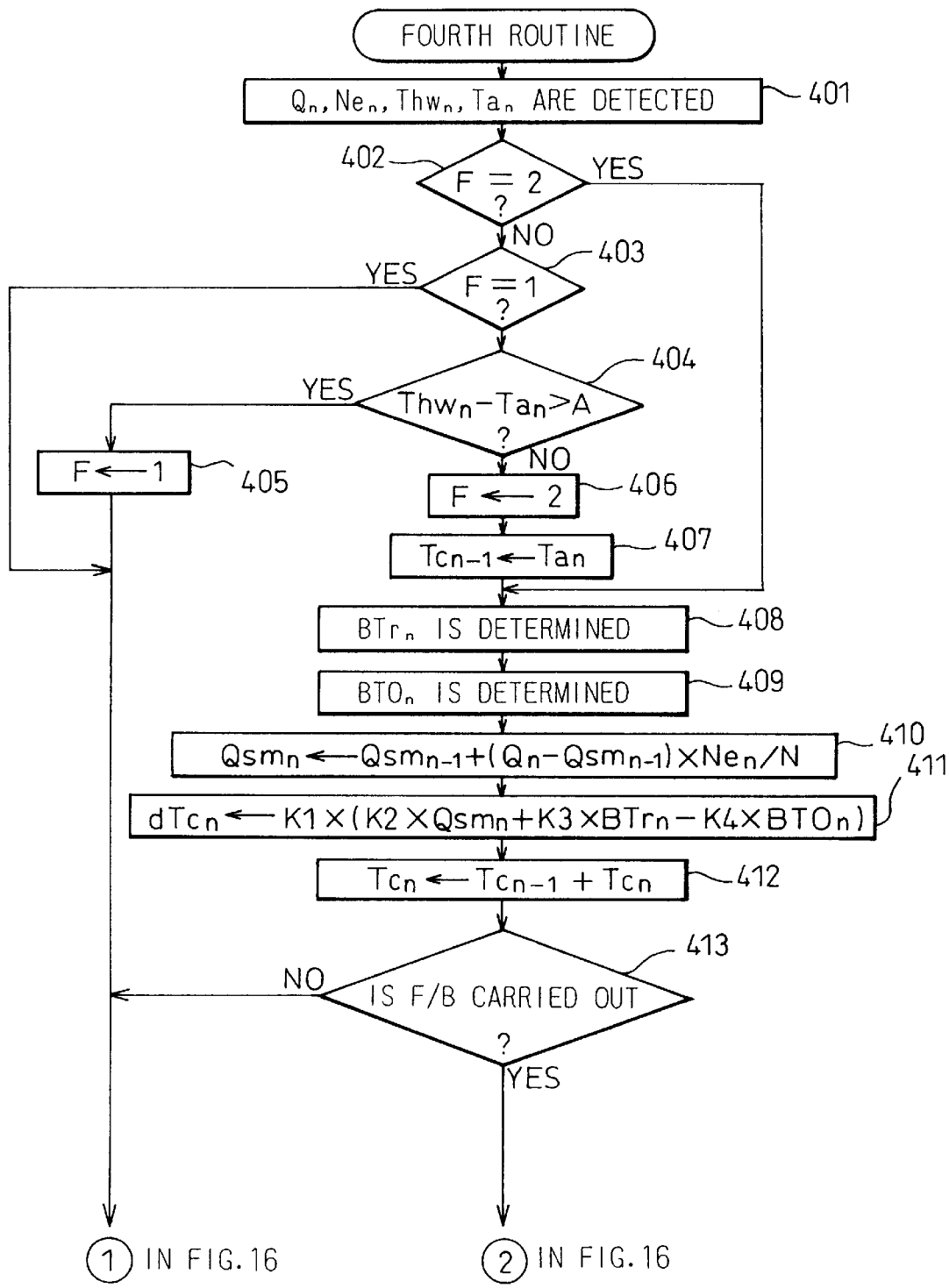
FIG. 15 is a part of a fourth routine for determining the abnormal degree of deterioration of a catalyst.
Figure 16:
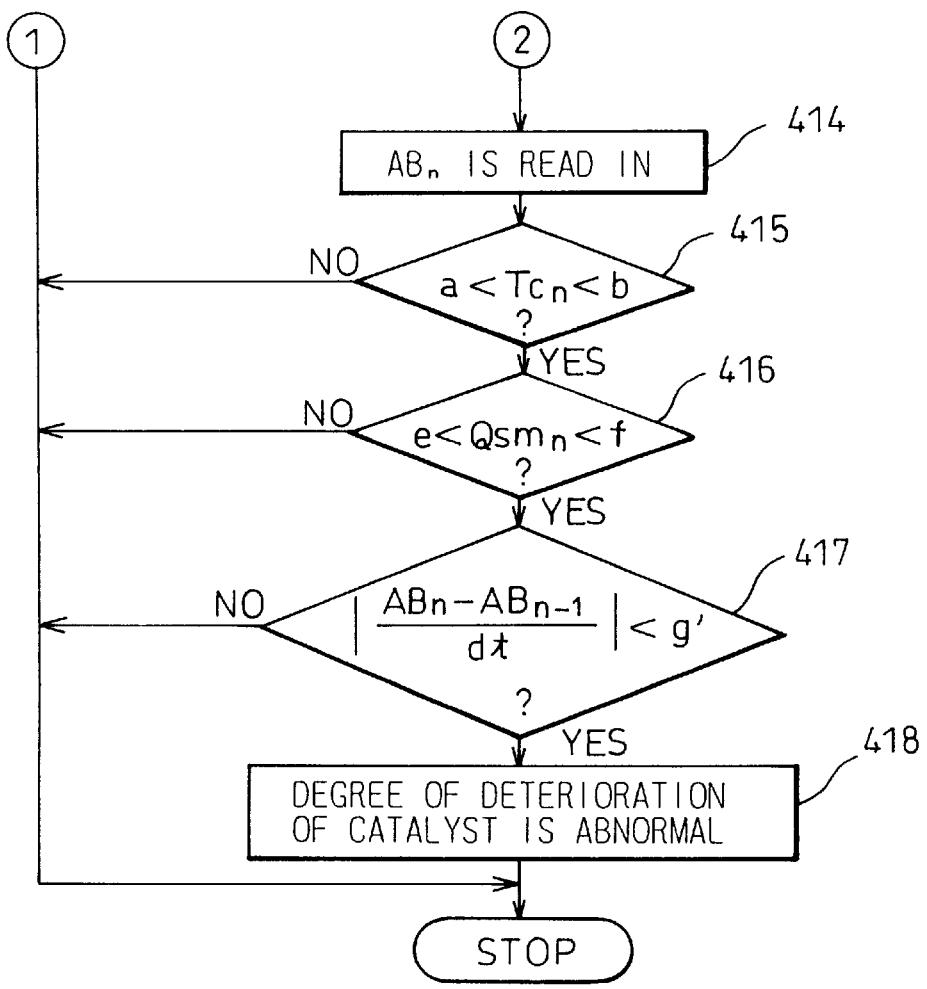
FIG. 16 is the remainder of the fourth routine.

The device 30' also determines if the degree of deterioration of the catalyst is abnormal, according to a fourth routine shown in FIGS. 15 and 16. The differences between the present routine and the third routine only are explained as follows. In the fourth routine, when the temperature of the catalyst [$Tc_n$] is within the predetermined range [a–b], the routine goes to step 416 and it is determined if the amount of calculated intake air [$Qsm_n$] is within the predetermined range [e–f]. When the result is affirmative, the routine goes to step 417. An absolute value of a ratio of a varying value of the purification ability of the catalyst [$AB_n - AB_{n-1}$] to the varying value of time [dt] is calculated, as a varying amount of the purification ability of the catalyst. It is determined if the absolute value of the ratio is smaller than a predetermined value [g']. The varying value of time [dt] is the predetermined period for repeating the routine. When the result at step 417 is affirmative, the routine goes to step 418 and it is determined that the degree of deterioration of the catalyst is abnormal, the same as in the above-mentioned second routine.

Figure 17:
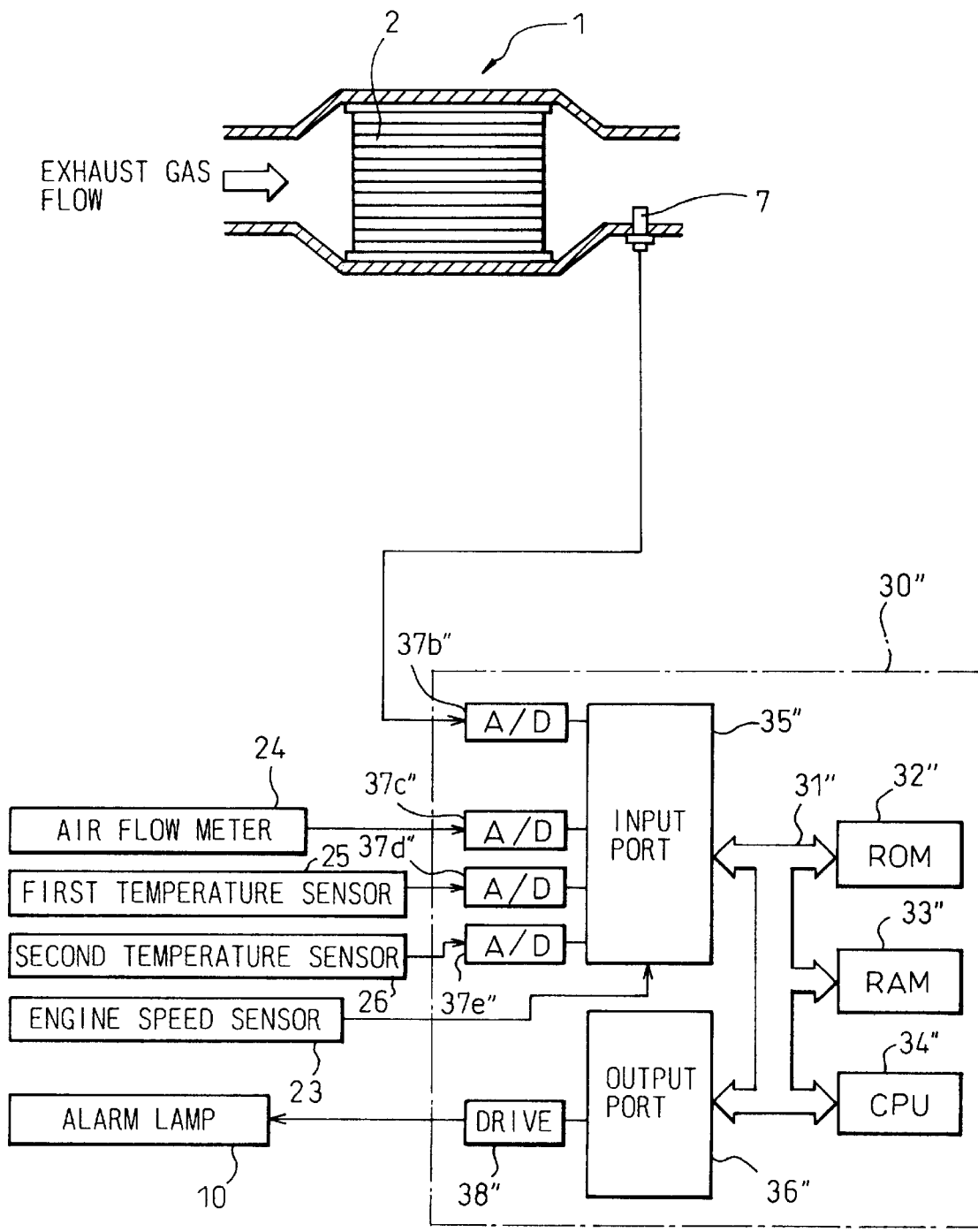
FIG. 17 is a sectional view of a part of an internal combustion engine exhaust system with further another device for determining the abnormal degree of deterioration of a catalyst.
Figure 18:
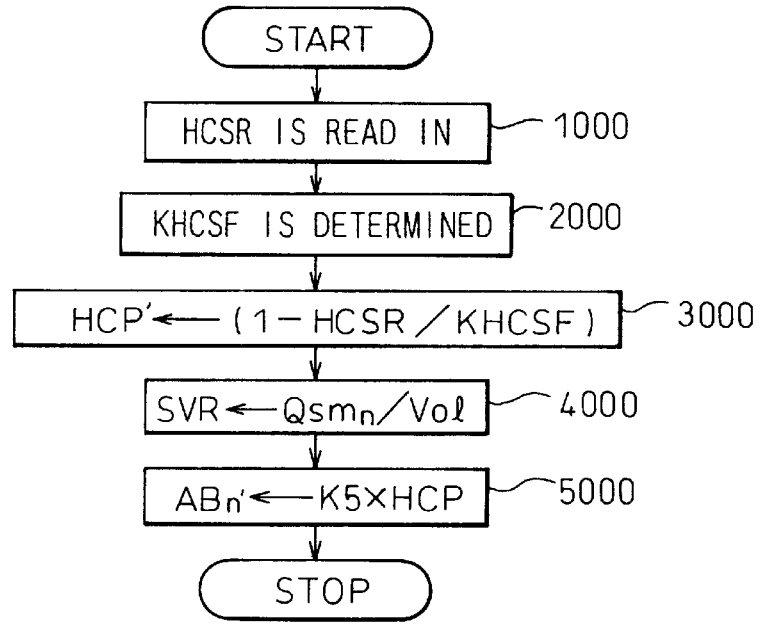
FIG. 18 is another routine for calculating the purification ability of the catalyst.

FIG. 17 is a sectional view of a part of an internal combustion engine exhaust system with a device for determining the abnormal degree of deterioration of a catalyst, using only one HC sensor. The difference between FIG. 17 and FIG. 10 is to have a HC sensor 7 downstream of the catalytic carrier 2, instead of the first HC sensor 5 and the second HC sensor 6. The device 30" calculates the purification ability of the catalyst according to a routine shown in FIG. 18, to determine if the degree of deterioration of the catalyst is abnormal. The routine would be explained as follows.

Figure 19:
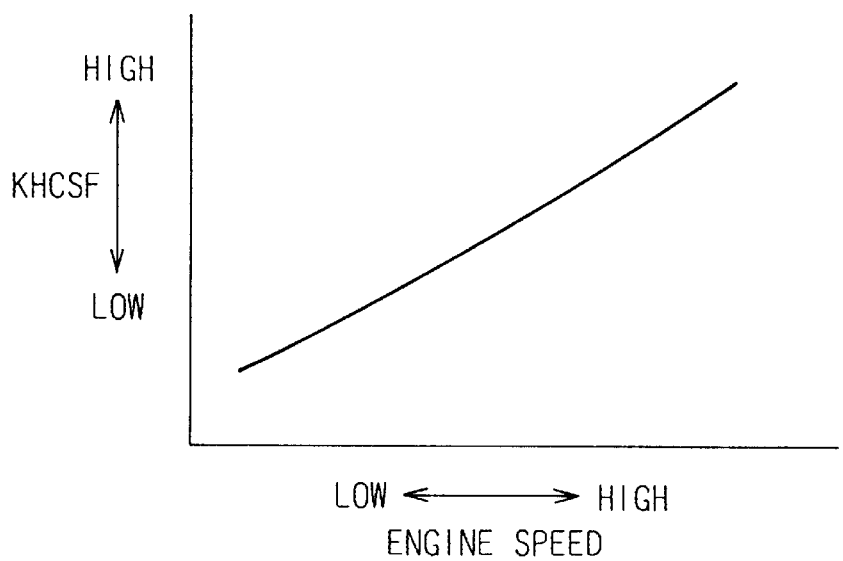
FIG. 19 is a map for determining HC concentration used in the routine of FIG. 18.

First, at step 1000, an output of the HC sensor 7, i.e., the HC concentration in the exhaust gas flowing out from the catalytic carrier 2 [HCSR] is read in. Next, at step 2000, the HC concentration in the exhaust gas flowing into the catalytic carrier 2 [KHCSF] is determined by a map shown in FIG. 19, on the basis of the current engine speed. At step 3000, a rate of purification of hydrocarbon [HCP'] is calculated by an expression (8).

$$HCP' = (1 - HCSR/KHCSF) \quad (8)$$

Next, at step 4000, a current catalytic carrier space speed [SVR] is calculated as same as in the routine shown in FIG. 13. At step 5000, a current purification ability of the catalyst [$AB_n'$] is calculated such that the rate of purification of hydrocarbon is multiplied by the fifth coefficient [K5]. The calculated purification ability of the catalyst can be used in the third or fourth routine. Thus, it can be determined if the degree of deterioration of the catalyst is abnormal using only one HC sensor.

In all of the routines, the current temperature of the catalyst is calculated. Of course, a measured value of the catalyst temperature may be used, instead of the calculated value.

In the first and second routines, the current $O_2$ storage ability is calculated as the current purification ability. In case that the catalytic converter space speed is large, and if the $O_2$ storage ability of the catalyst is high, the amount of oxygen blowing through the catalytic carrier without being stored become large. Accordingly, if in the calculation of the $O_2$ storage ability, a current catalytic carrier space speed is taken account of, the grasped $O_2$ storage ability of the catalyst, i.e., the grasped purification ability thereof becomes more accurate.

In the second and fourth routines, a current amount of intake air is used to determine that a current engine operating condition is steady. Of course, a current degree of opening of an accelerator pedal or a current engine speed may be used, instead of the amount of intake air. To be able to determined if the degree of deterioration of the catalyst is abnormal in an engine steady operating condition other than the predetermined engine steady operating condition, the threshold value [g] or [g'] may be changed to take account that a varying value of the temperature of the catalyst against a predetermined time [dt] varies every engine steady operating condition.

Although the invention has been described with reference to specific embodiments thereof, it should be apparent that numerous modifications can be made thereto by those skilled in the art, without departing from the basic concept and scope of the invention.

We claim:

1. A device for determining a degree of deterioration of a catalytic converter arranged in an exhaust system of an internal combustion engine, comprising:

means for detecting a parameter corresponding to an ability of the catalyst to purify exhaust gas;

means for detecting a temperature of the catalyst;

a processor for determining a purification ability value based on the value of the parameter detected and for determining a ratio of a variation over time of the ability value to a variation over time of the catalyst temperature, wherein the processor determines that a degree of deterioration of the catalyst is abnormal when the ratio is smaller than a predetermined value.

2. A device according to claim 1, wherein the parameter detected corresponds to an $O_2$ storage ability of the catalyst.

3. A device according to claim 1, wherein the parameter detected corresponds to an HC purification ability of the catalyst.

4. A device according to claim 1, wherein the processor determines a degree of deterioration of the catalyst only when the temperature of the catalyst is within a predetermined temperature range.

5. A device according to claim 1, wherein the variation of the temperature of the catalyst is compared to the variation of the purification ability of the catalyst only when the engine is in a steady operating condition.

6. A device according to claim 1, wherein the variation of the temperature of the catalyst is compared to the variation of the purification ability of the catalyst only when an amount of intake air is within a predetermined range.

7. A device for determining a degree of deterioration of a catalytic converter arranged in an exhaust system of an internal combustion engine, comprising:

a temperature sensor for detecting a temperature of the catalyst;

means for detecting a composition of exhaust gas leaving the catalyst and, based on the detected composition, calculating an ability value corresponding to a current ability of the catalyst to purify exhaust gas;

a control unit coupled to the temperature sensor and the composition detecting means, wherein the control unit calculates a variation ratio of an amount of variation of the temperature of the catalyst to an amount of variation of the ability value and wherein the control unit determines a degree of deterioration of the catalyst based on the variation ratio and determines that the degree of deterioration of the catalyst is abnormal when the variation ratio is smaller than a predetermined value.

* * * * *